Patented Mar. 28, 1944

2,345,358

UNITED STATES PATENT OFFICE 2,345,358

CATALYTIC PROCESS OF DEHYDRATING AND HEAT-BODYING

Alfred E. Rheineck and Samuel B. Crecelius, Louisville, Ky., assignors to Devoe and Raynolds Company, Inc., a corporation of New York No Drawing. Application April 7, 1941, Serial No. 387,180

13 Claims. (Cl. 260—405.5)

This application is based upon our discovery that there is a group of substances which have the combined capacity of acting as exceedingly efficient dehydration catalysts for castor oil and also as very efficient bodying catalysts for the drying oils in general, including dehydrated castor oil. When used with castor oil, the two effects may be accomplished virtually simultaneously. That is, the oil is bodied almost as rapidly as it is dehydrated.

The substances which we prefer to use are preferably the heteropoly tungstic acids which include such acids as silico-tungstic acid

phospho-tungstic acid ($H_7P(W_2O_7)_6.XH_2O$), boro-tungstic acid ($H_9B(W_2O_7)_6.22H_2O$) and molybdo-phospho-tungstic acid

The specific formulas given are intended to indicate the nature of the compounds that may be employed and not by way of limitation. Actually there is some discussion as to the specific formulas of these compounds particularly as regards the amount of water of crystallization.

The action of these substances appears to be purely catalytic and in fact only very minute traces should be used. Thus if one uses as much as one percent of these substances based on the weight of the oil, the product tends to react with violence and frequently in a few minutes at a temperature of from 160° C. to 170° C. will yield products which are black gels. In our experience it is very rare that more than 0.2% should be employed. Actually, we find it preferable to use between 0.005 and 0.1% and generally speaking the best results seem to be had using between 0.01 and 0.05%. It will be noted that the amount of this catalyst used runs from about 1/10 to 1/500 of the amount of catalyst normally employed for dehydration purposes.

Using these catalysts in the amount specified, dehydration starts at about 160° C. and may proceed quite vigorously at a temperature of between 170° and 200° C. However, we have found that for dehydration alone it is preferable to use a temperature which is gradually increased as dehydration progresses and it should reach an ultimate top ranging between 160° C. and about 230° C. If the temperature is raised progressively to a point toward the top of this range dehydration may be accomplished within a period of from 30 to 60 minutes.

At these temperatures (particularly at the lower end of the range) relatively little bodying takes place, and therefore by maintaining low temperatures our catalyst can be employed to dehydrate castor oil while still maintaining a relatively low viscosity, which is desirable in some cases, as for example in the production of the alkyd resins. Where bodying is desired, as in the manufacture of oleoresinous varnishes, the temperature should be raised quite rapidly to at least 250° C. and preferably to 260° C. Of course, if one is working with castor oil, water will be driven off so rapidly at these temperatures that foaming will be substantial and the extent of the foaming will impose a practical top limit on the temperature at various stages in the dehydration. Ordinarily one would not want to go above about 310° for more than a few moments.

Using our catalysts for bodying other oils, the foaming factor will not be important, but as is known in the art, better color is obtained if the temperatures are kept low and if vacuum can be applied, although it is not essential. As a practical matter, we believe that a temperature of 350° C. is a maximum that should be employed, and ordinarily it is preferable to keep below 300° for the bulk of the operation.

The amount of catalyst employed is so small that it ordinarily will not be necessary to remove it from the oil, but if desired, all or a part of the catalyst can be precipitated out by the formation of insoluble salts, as for example, by the use of a small amount of lime or other reactive calcium compound, or corresponding compounds of lead or of other metals that will form insoluble compounds by reaction with the particular catalyst used.

Using the catalysts in this way, exceedingly valuable results can be obtained. Thus usually the dehydration of castor oil takes about 3 hours when working on a commercial scale, and where bodying is desired, this usually takes an additional period which may run from 4 to 5 hours. Using our process, we have obtained a substantially dehydrated castor oil bodied to a viscosity of $Z_2$ or $Z_3$ on the Gardner-Holdt scale in about 3 hours. This means a great economy in operation and also produces an oil of desirable color.

Due to the large amount of water that is being evolved during the bodying operation, there is some tendency to split off fatty acids from the oil. These either may be distilled out by the use of vacuum or for some purposes the oil can be used with the fatty acids left in. For example, this combined oil makes an exceedingly valuable basis where further alcoholysis with polyhydric alcohols and subsequent esterification with other bodies such as rosin, is contemplated.

In carrying out the operation, a solvent may be employed to aid in distilling off the water. If a low boiling solvent such as xylene is used, the amount employed should be small enough so that the solution as a whole will have a boiling point high enough to give the desired results.

Ordinarily our catalyst will be mixed with the oil and the oil treated in batch lots. However, it also may be applied to a carrier such as asbestos fibers and then packed in a vertical heated tower. This is particularly useful for dehydration purposes, but due to the rapidity of the action of the catalyst, it may also be employed to give some bodying effect.

From the point of view of dehydration, the only natural oil where this problem is of any importance is castor oil, but our process may also be used in connection with hydroxylated products such, for example, as dihydroxy stearic acid or other hydroxy products of this type.

The following examples illustrate the manner in which we have carried out our process and show the particularly advantageous results obtained both from the point of view of time consumed and low loss incident to the use of our process.

Example I 100 parts of castor oil was mixed with 0.03 part of silico-tungstic acid and heated with stirring. The following table summarizes the log of the run:

| Time | Temp. | Vacuum |
|---|---|---|
| Hours | °C. | Inches |
| ½ | 204 | 28 |
| 1 | 300 | 27½ |
| 1½ | 303 | 27½ |
| 1⅚ | (1) | |
| 2 | 250 | 27½ |

[1] Cooler turned on.

Example II

After cooling, the final product showed a viscosity of $Z_3$ and an acid value of 10.40.

100 parts of castor oil was mixed with 0.03 part of silico-tungstic acid and heated with stirring. In this example the temperatures used were somewhat lower than the Example #1. The following table summarizes the log of the run:

| Time | Temp. | Vacuum mm. of Hg |
|---|---|---|
| Hours | °C. | Mm. |
| 1 | 215 | 50 |
| 1½ | 273 | 24 |
| 2 | 273 | 20 |
| 3 | 273 | 20 |

After cooling, the final product had the following properties: viscosity $Z_3$; color 12; ref. ind. 1.4893; acid value 11.1.

Example III 100 parts of castor oil was mixed with 0.07 part of phospho-tungstic acid and heated with stirring, as before. The following table summarizes the log of the run:

| Time | Temp. | Vacuum |
|---|---|---|
| Hours | °C. | Mm. |
| 1 | 305 | 28 |
| 2 | 305 | 28 |
| 3 | 303 | 28 |
| 3½ | 300 | 29 |

After cooling, the product had the following properties: viscosity $Z_3$; color 8-9 (green cast); ref. ind. 1.4885; acid value 6.8.

Example IV 100 parts of castor oil was mixed with 0.1 part of phospho-tungstic acid. The mixture was heated with stirring, as before, and the following table summarizes the log of the run:

| Time | Temp. | Vacuum |
|---|---|---|
| Hours | °C. | Mm. |
| 1 | 240 | 28 |
| 2 | 300 | 28 |
| 2½ | 300 | 28 |

Upon cooling, this oil had the following properties: viscosity $Z_6$ plus; color 9-10 (green cast); ref. ind. 1.4905; acid value 7.8; loss 11%.

Example V 100 parts of castor oil was heated with 0.04 part boro-tungstic acid. In this case the boro-tungstic acid was dissolved in water the solution added to the castor oil. The mixture was stirred and heat and vacuum applied. Under 2 mm. pressure the dehydration started when 165° C. was reached. At the end of 2½ hours 280° C. was reached. The cooled product had the following constants: viscosity U to V; ref. ind. 1.4850; color 7; acid value 9.3; acetyl value 19.0.

Example VI

In this example, 100 parts of castor oil was mixed with 0.05 part of boro-tungstic acid and 10 parts of xylene. The reaction vessel was equipped with a stirrer and a modified Bidwell & Stirling tube which was used to collect the water and solvent distilled from the mixture and trapping the water while the solvent was continuously returned to the flask. Water started to come over continuously after a temperature of 170° C. was reached. After one hour a temperature of 270° was reached and then both solvent and water were removed. About 4¾ parts of water were recovered. The final product had the following properties: viscosity $Z_4$; ref. ind. 1.4885; color 8; acid value 18; acetyl value 10.

Example VII 100 parts of castor oil was mixed with 0.03 part of molybdo-phosphotungstic acid and heated with stirring. The following table summarizes the log of the run:

| Time | Temp. | Vacuum mm. of Hg |
|---|---|---|
| Minutes | °C. | |
| 10 | 140 | 40 mm. |
| 25 | 180 | 40 |
| 50 | 210 | 40 |
| 55 | 230 | 40 sample |
| Vis. S., Ref. Ind. 1.4840 | | |
| 85 | 270 | 40 sample |
| Vis. W., Ref. Ind. 1.4865 | | |
| 130 | 260 | Final |
| Vis. $Z^1$ | | |

In this case the molybdo-phosphotungstic acid was prepared as described by N. Bezssonov. Chem Abst. 20, 3477, 1926.

Example VIII

In this example the catalyst is used solely for heat bodying. 0.02 part of silico-tungstic acid was mixed with 100 parts of alkali refined linseed oil and heated to a temperature of 305° C. for 85 minutes. The resulting product showed a body of between $Z_3$ and $Z_4$ on the Gardner-Holdt scale, whereas, a comparative sample of material treated under identical conditions but without the catalyst, showed a body of between I and J on that scale.

Example IX

Castor oil was heated with 0.03% of silico-tungstic acid until a viscosity of $Z_3$ was reached. At this stage the product contained an appreciable percentage of free fatty acids. 1780 parts of this product was cooled to about 200° C. and 92 parts of glycerol and one part of calcium acetate were added with stirring. This amount of glycerol was in excess of the amount necessary to react with the free fatty acids to produce the triglyceride. The calcium acetate was added to serve as a catalyst to cause a reaction to take place between the glycerol and the bodied, dehydrated castor oil by alcoholysis in addition to the straight esterification reaction between the free fatty acids and the glycerol, and also causes a neutralization and precipitation of the initial catalyst. A temperature of 260° C. was gained and held for 30 minutes. Then 1150 parts of WG rosin and 100 parts of 100% phenolic resin (reactive type) was stirred in and the temperature was raised to 270° C. and held for 3 hours, causing an esterification of residual hydroxyl groups to take place.

The varnish was cooled to 270° C. and thinned with mineral spirits to a viscosity of F on the Gardner-Holdt scale, at which point it contained about 50% solids. Usual driers were added and the resulting varnish dried in 8 hours.

The subject-matter of the foregoing Example IX illustrating the preparation of a varnish is specifically claimed in our copending application Ser. No. 518,476, filed January 14, 1944, as a division of this case.

All of the oils prepared in accordance with the first seven examples were heat-bodied, dehydrated castor oils and each of them dried to a smooth, hard film when treated with .5% lead and .05% cobalt as driers. When used in varnishes, the finished products possessed properties substantially identical with those of products prepared from the oils commercially available.

From these examples and the foregoing description, the methods of utilizing our invention in other specific manners can readily be understood.

In the claims we refer to a process of heat-bodying a drying oil. In such case we intend to include a process where castor oil is employed. Of course, castor oil is usually considered to be a non-drying oil but as has already been brought out when castor oil is heated with heteropoly acidic compounds of tungsten, the first effect is to dehydrate it and thereby convert it into a drying oil, and the resultant drying oil is heat-bodied, though as a practical matter, the two effects may appear to go on simultaneously.

What we claim is:

1. The process of treating castor oil to simultaneously dehydrate it and body it, which comprises heating such oil progressively to reach a temperature of between 250° C. and 350° C. with between 0.005% and 0.2% of a heteropoly acidic compound of tungsten.

2. A process as specified in claim 1 in which the acid is silico-tungstic acid.

3. A process as specified in claim 1 in which the acid is phospho-tungstic acid.

4. A process as specified in claim 1, in which the acid is boro-tungstic acid.

5. The process of treating drying oil to body it, which comprises heating such oil progressively to a temperature of between 250° C. and 350° C. with between 0.005% and 0.2% of a heteropoly acidic compound of tungsten.

6. The process of treating castor oil to dehydrate it which comprises passing the oil over a catalytic body comprising a heteropoly acidic compound of tungsten at a temperature of between 160° C. and 310° C.

7. In the process of heat-bodying a drying oil, the step of heating such an oil with a quantity of a heteropoly acidic compound of tungsten sufficient to have a substantial catalytic effect upon the bodying of the oil.

8. A process as specified in claim 7 in which the amount of catalyst employed is between 0.005% and 0.2%.

9. A process as specified in claim 7 in which the temperature of the reaction is between 160° C. and 350° C.

10. A process as specified in claim 7 in which the oil treated is a hydroxylated oil which is dehydrated to convert it into a drying oil and heat-bodied.

11. A process as specified in claim 7 in which the oil treated is a natural drying oil.

12. A composition consisting of a fatty oil selected from the group consisting of the natural drying oils and hydroxylated oils adapted to be converted into drying oils by dehydration, and a catalyst comprising a heteropoly acidic compound of tungsten.

13. A composition as specified in claim 12 in which the catalyst is present in an amount of between 0.005% and 0.2% of the weight of the oil.

ALFRED E. RHEINECK.
SAMUEL B. CRECELIUS.